United States Patent
Kusuma et al.

(10) Patent No.: US 8,350,716 B2
(45) Date of Patent: Jan. 8, 2013

(54) SYSTEM AND METHOD FOR COMMUNICATING DATA BETWEEN WELLBORE INSTRUMENTS AND SURFACE DEVICES

(75) Inventors: Julius Kusuma, Somerville, MA (US); Frederic Latrille, Houston, TX (US)

(73) Assignee: Intelliserv, LLC, Houston, TX (US)

( * ) Notice: Subject to any disclaimer, the term of this patent is extended or adjusted under 35 U.S.C. 154(b) by 637 days.

(21) Appl. No.: 12/552,394

(22) Filed: Sep. 2, 2009

(65) Prior Publication Data
US 2011/0050452 A1    Mar. 3, 2011

(51) Int. Cl.
*G01V 3/00* (2006.01)
(52) U.S. Cl. .................. 340/853.7; 340/853.5
(58) Field of Classification Search ............... 340/853.7, 340/855.7; 367/82, 33, 34, 25
See application file for complete search history.

(56) References Cited

U.S. PATENT DOCUMENTS

| | | | |
|---|---|---|---|
| 4,684,947 A | 8/1987 | Zimmer | |
| 4,739,325 A | 4/1988 | MacLeod | |
| 5,339,036 A | 8/1994 | Clark et al. | |
| 6,641,434 B2 | 11/2003 | Boyle et al. | |
| 6,909,667 B2 | 6/2005 | Shah et al. | |
| 7,224,288 B2 | 5/2007 | Hall et al. | |
| 2005/0046592 A1* | 3/2005 | Cooper et al. | 340/855.7 |
| 2006/0225926 A1 | 10/2006 | Madhavan et al. | |
| 2007/0057811 A1 | 3/2007 | Mehta | |

OTHER PUBLICATIONS

International Application No. PCT/US2010/046869 Search Report and Written Opinion dated Mar. 31, 2011.

* cited by examiner

*Primary Examiner* — Joseph Lauture
(74) *Attorney, Agent, or Firm* — Conley Rose, P.C.

(57) ABSTRACT

A method for communicating signals between an instrument in a wellbore and a device at the Earth's surface using a wired drill pipe telemetry channel includes allocating signals generated by at least one instrument in the wellbore to a plurality of buffers. Each buffer represents data having a respective communication priority. Signals from each buffer are communicated to the wired drill pipe telemetry channel according to a predetermined priority procedure. The procedure allocates telemetry channel priority related to the communication priority.

19 Claims, 3 Drawing Sheets

SYSTEM AND METHOD FOR COMMUNICATING DATA BETWEEN WELLBORE INSTRUMENTS AND SURFACE DEVICES

BACKGROUND OF THE INVENTION

1. Field of the Invention

The invention relates generally to the field of wellbore instruments and well logging methods. More specifically, the invention relates to systems and methods for communicating data and commands between wellbore disposed instruments and a surface disposed control and recording unit.

2. Background Art

Well logging instruments are devices configured to move through a wellbore drilled through subsurface rock formations. The devices include one or more transmitters, sensors, actuators, and other devices that measure various properties of the subsurface rock formations and/or perform certain physical or mechanical acts on the formations, such as drilling or percussively obtaining samples of the rock formations, and withdrawing samples of connate fluid from the rock formations. Measurements of the properties of the rock formations made by the sensors may be recorded with respect to the instrument axial position (depth) within the wellbore as the instrument is moved along the wellbore. Such recording is referred to as a "well log."

Well logging instruments can be conveyed along the wellbore by extending and withdrawing an armored electrical cable ("wireline"), wherein the instruments are coupled to the end of the wireline. Such conveyance relies on gravity to move the instruments into the wellbore. Extending and withdrawing the wireline may be performed using a winch or similar spooling device known in the art. It is also known in the art to use "logging while drilling" ("LWD") instruments in certain circumstances. Such circumstances include expensive drilling operations, where the time needed to suspend drilling operations in order to make the wellbore accessible to wireline instruments would make the cost of such access prohibitive, and wellbores having a substantial lateral displacement from the surface location of the well. Such circumstances include large lateral displacement of the wellbore particularly where long wellbore segments having high inclination (deviation from vertical). In such cases, gravity is not able to overcome friction between the instruments and the wellbore wall, thus making wireline conveyance impracticable unless it is complemented by an actuator, known as a tractor, to provide movement. LWD instrumentation has proven technically and economically successful under the appropriate conditions. LWD instrumentation is also typically used in conjunction with so-called measurement while drilling ("MWD") instrumentation. MWD instruments typically include navigation sensors that determine the geodetic trajectory of the wellbore, and can include sensors that measure mechanical parameters such as torque applied to the pipe string, vibration, angular acceleration, and pressure in the annular space between the wall of the wellbore and the drill string.

MWD and LWD instruments are typically disposed in thick walled segments of pipe called drill collars, and such collars are typically disposed proximate the lower end of a "string" of pipe segments coupled end to end to form a "drill string." Signals from the various sensors in MWD and LWD instruments are typically communicated to the Earth's surface using a device that modulates flow of drilling fluid as the fluid is pumped through the drill string. One or more pressure transducers disposed at the surface detect pressure changes caused by the modulator. The detected pressure changes are then decoded into the signals that were transmitted by the MWD and LWD instruments. Mud flow modulation telemetry is typically limited to a transmission rate of several bits per second.

Another MWD/LWD data communication technique known in the art of extremely low frequency ("ELF") electromagnetic telemetry. Just as is the case with mud modulation telemetry, the data rate is relatively low. Further, electromagnetic telemetry is not useful where subsurface formations are highly electrically conductive.

More recently, a type of drill pipe has been developed that includes an electromagnetic signal communication channel. See, for example, U.S. Pat. No. 6,641,434 issued to Boyle et al. and assigned to the assignee of the present invention. Such drill pipe has in particular provided substantially increased signal telemetry speed for use with LWD instruments over conventional LWD signal telemetry, which typically is performed by mud pressure modulation or by very low frequency electromagnetic signal transmission.

In any of the foregoing examples, as well as other types of well logging instrumentation, data obtained from the various sensors in the MWD and LWD instruments are communicated to a device such as a data acquisition and recording unit disposed at the Earth's surface. Data and command signals may also be communicated from the device to the various instruments in the wellbore. Even when using multiple data communication systems, e.g., both wired drill pipe and mud flow modulation (or electromagnetic), the volume of data generated by typical MWD/LWD instrument configurations is such that optimized use of the data communication channels is desirable. The present invention addresses various forms of data communication to optimize use of available communication channels.

SUMMARY OF THE INVENTION

A method according to one aspect of the invention for communicating signals from between an instrument in a wellbore and devices at the Earth's surface using a wellbore telemetry channel includes allocating signals generated by at least one of an instrument in the wellbore and the surface device to a plurality of buffers. Each buffer represents data having a respective communication priority. Signals from each buffer are communicated to the wellbore telemetry channel according to a predetermined priority procedure. The procedure allocates telemetry channel priority related to the communication priority.

A system for communicating signals from between as instrument in a wellbore ans a device at the Earth's surface according to another aspect of the invention includes at least two sources of signals associated with the wellbore instrument. A data buffer is disposed in the wellbore instrument. A telemetry transceiver is in signal communication with the data buffer and a wellbore data communication channel. A telemetry controller is disposed in the wellbore instrument. The controller is configured to allocate signals from the at least two sources to corresponding portions of the data buffer. The controller is configured to cause content of each portion of the buffer to communicate signals stored therein to the telemetry transceiver according to a predetermined priority.

Other aspects and advantages of the invention will be apparent from the following description and the appended claims.

DETAILED DESCRIPTION

Figure 1:
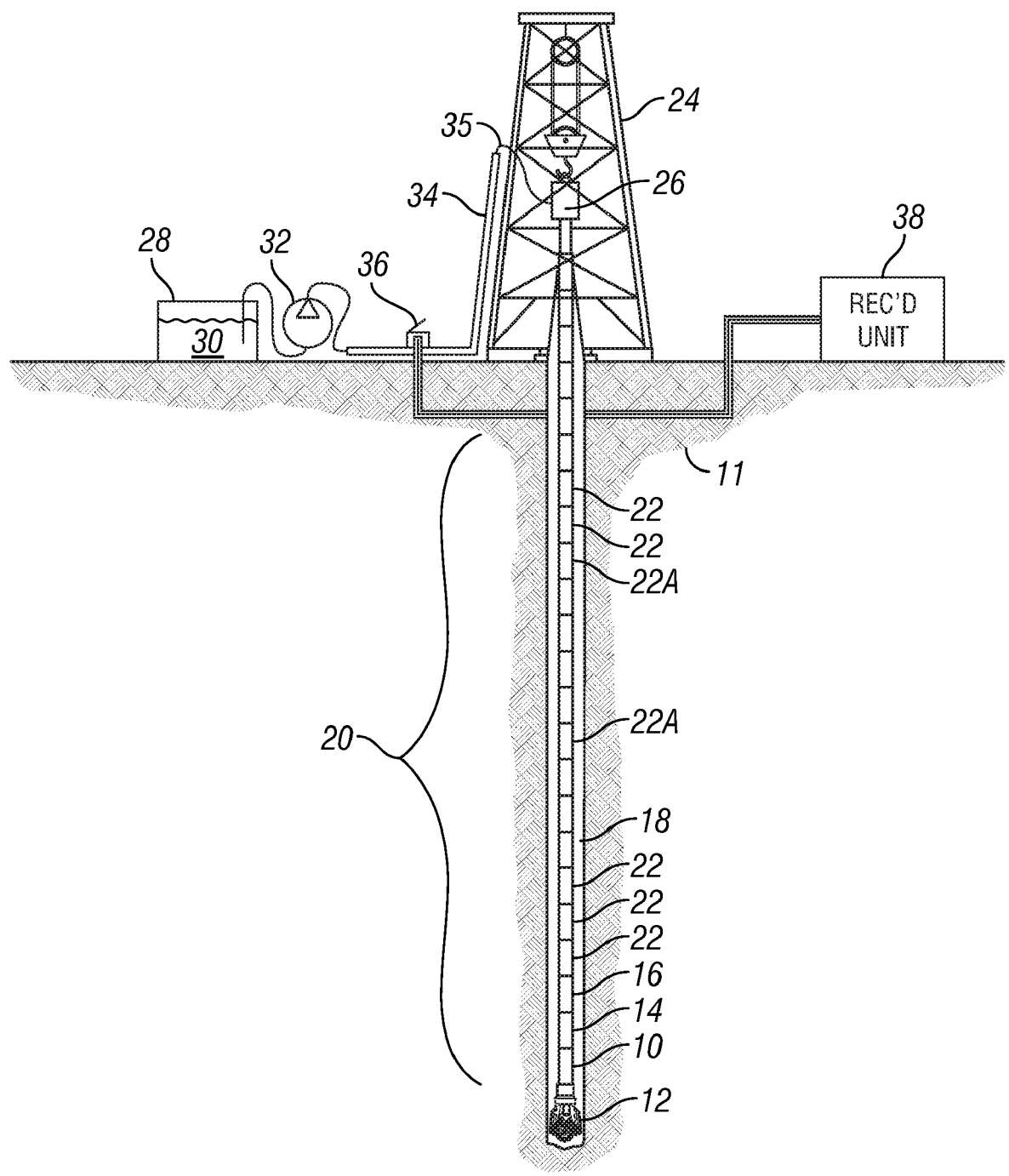
FIG. 1 shows an example of well logging instruments being conveyed through a wellbore using a wired pipe string.

In FIG. 1, a drilling rig 24 or similar lifting device suspends a conduit called a drill string 20 within a wellbore 18 being drilled through subsurface Earth formations 11. The drill string 20 may be assembled by threadedly coupling together end to end a number of segments ("joints") 22 of drill pipe. The drill string 20 may include a drill bit 12 at its lower end. When the drill bit 12 is axially urged into the formations 11 at the bottom of the wellbore 18 and when it is rotated by equipment (e.g., top drive 26) on the drilling rig 24, such urging and rotation causes the bit 12 to axially extend ("deepen") the wellbore 18. Proximate the lower end of the drill string 20 may be disposed a first wellbore instrument 14 and a second wellbore instrument 10. The instruments 10, 14 may be any tool or device capable of operation in a wellbore 18. The instruments 10, 14 may measure a characteristic of the drill string 20, the wellbore 18 or the Earth formations 11. In an embodiment, the instruments 10, 14 may be logging while drilling ("LWD") instruments. A telemetry unit 16 may include both electromagnetic (or optical) signal telemetry devices and fluid flow modulation telemetry devices (see FIG. 2) to communicate signals from the surface and to communicate signals from the wellbore instruments 10, 14 to the surface. As used herein, therefore, the term "wellbore communication channel" is intended to mean any device for communication of signals between the Earth's surface and the instruments in the wellbore, non limiting examples of which include the described drill pipe electromagnetic or optical channel, the mud modulation channel and ELF electromagnetic channel. Example components the wellbore instruments 10, 14 will be further explained below with reference to FIG. 2.

The drill string 20 in the present example may be a so-called "wired" pipe string that has associated with each pipe joint a cable, such as an electrical and/or optical conductor (not shown in FIG. 1) for communicating electrical power and signals from the wellbore instruments 10, 14 to the surface. Non-limiting examples of such wired, threadedly coupled drill pipe are described in U.S. Patent Application Publication No. 2006/0225926 filed by Madhavan et al., the underlying patent application for which is assigned to the assignee of the present invention. Another example as explained in the Background section herein is a drill pipe including an electromagnetic signal communication channel described in U.S. Pat. No. 6,641,434 issued to Boyle et al. and assigned to the assignee of the present invention. Such drill pipe structures are only provided as examples and are not intended to limit the scope of the present invention. When such wired drill pipe is used, the telemetry unit 16 can include suitable devices for coupling signals from the wellbore instruments 10, 14 to the signal communication channel in the drill string 20. Such devices will be further explained below with reference to FIG. 2.

During drilling of the wellbore 18, a pump 32 lifts drilling fluid ("mud") 30 from a tank 28 or pit and discharges the mud 30 under pressure through a standpipe 34 and flexible conduit 35 or hose, through the top drive 26 and into an interior passage (not shown separately in FIG. 1) inside the drill string 20. The mud 30 exits the drill string 20 through courses or nozzles (not shown separately) in the drill bit 12, where it then cools and lubricates the drill bit 12 and lifts drill cuttings generated by the drill bit 12 to the Earth's surface. In some examples, signals from the wellbore instruments 10, 14 may be communicated to a telemetry transmitter (FIG. 2) in the telemetry unit 16 that modulates the flow of the mud 30 through the drill string 20. Such modulation may cause pressure variations in the mud 30 that may be detected at the Earth's surface by a pressure transducer 36 coupled at a selected position between the outlet of the pump 32 and the top drive 26. Signals from the transducer 36, which may be electrical and/or optical signals, for example, may be conducted to a device disposed at the surface for receiving such signals, such as a recording unit 38 having components (not shown) for decoding and interpretation using techniques well known in the art. The decoded signals can include measurements made by one or more of the sensors (not shown) in the wellbore instruments 10, 14. For purposes of the present invention, the mud flow modulation telemetry is described only to show that such telemetry can be used in addition to electrical or optical telemetry used in connection with the wired drill pipe string 20.

It will be appreciated by those skilled in the art that the top drive 26 may be substituted in other examples by a swivel, kelly, kelly bushing and rotary table (none shown in FIG. 1) for rotating the drill string 20 while providing a pressure sealed passage through the drill string 20 for the mud 30. Accordingly, the invention is not limited in scope to use with top drive drilling systems.

When wired drill pipe is used for the drill string 20, the drill string 20 may include at selected positions along its length a signal repeater 22A. The signal repeaters 22A are used to receive and retransmit signals communicated in either direction along the drill string 20 so that there is sufficient signal amplitude at the wellbore instruments 10, 14 to detect signals, for example commands transmitted from the recording unit 38, and for the recording unit 38 to detect signals transmitted by the telemetry unit 16, for example signals generated in response to measurements made by sensors (FIG. 2) in the wellbore instruments 10, 14. One non-limiting example of a structure for the repeaters 22A is described in U.S. Pat. No. 7,224,288 issued to Hall et al. Applicable details of the repeaters 22A as they relate to the present invention will be explained below with reference to FIG. 2.

Figure 2:
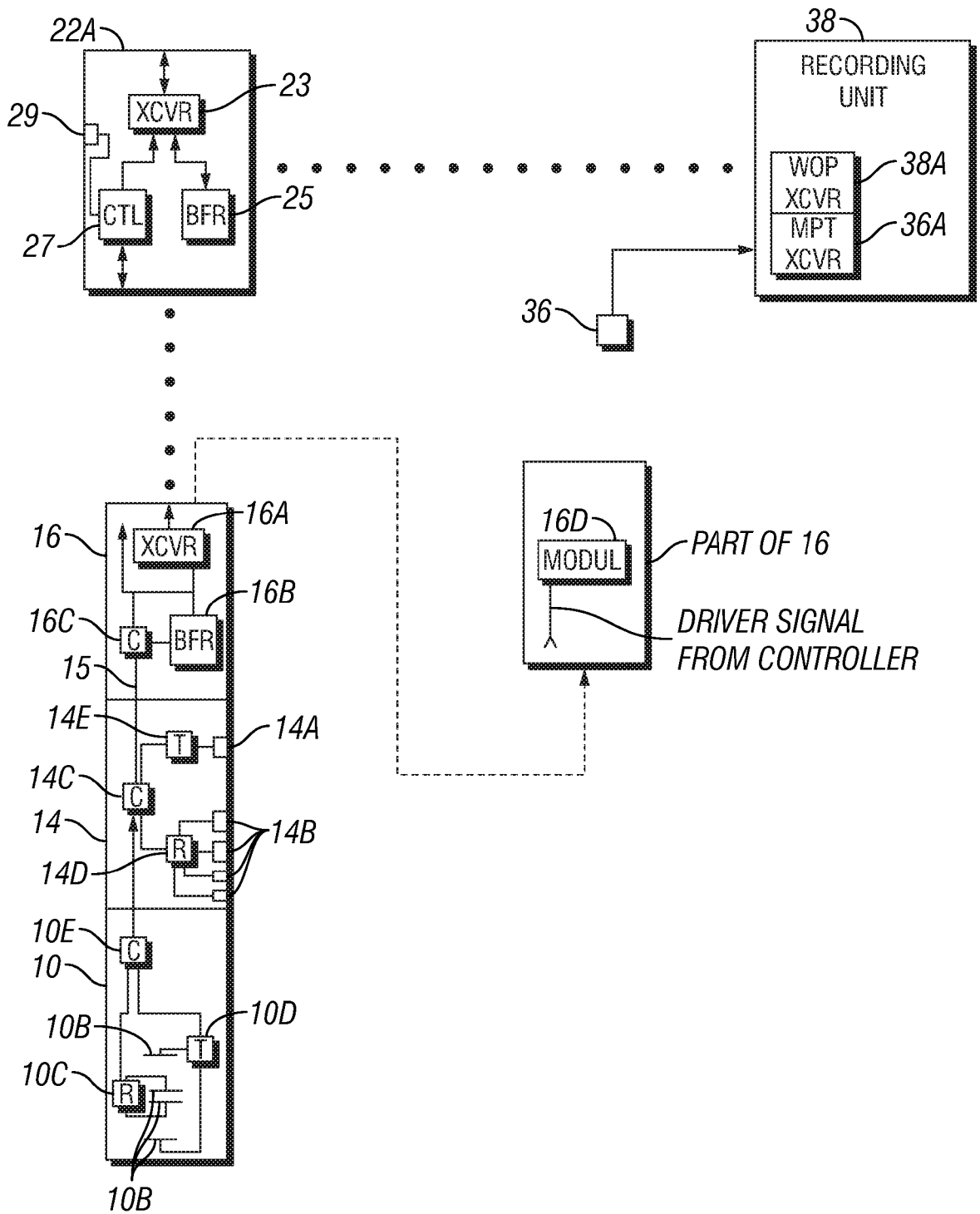
FIG. 2 shows an example telemetry system including data buffers associated with telemetry transceivers.

FIG. 2 shows a functional block diagram of examples of wellbore instruments 10, 14, such as the LWD instruments, as well as the telemetry unit 16, the surface recording unit 38 and an example of one of the repeaters 22A in order to explain various aspects of the invention. The recording unit 38 may include a telemetry transceiver 38A for signal communication with the wired drill pipe string (20 in FIG. 1), such as for receiving signals transmitted from the wellbore instruments 10, 14 and for transmitting commands and other signals to the wellbore instruments 10, 14. The recording unit 38 may also include a mud pressure (or flow) modulation telemetry transceiver 36A in signal communication with the pressure transducer 36. Signals communicated from the pressure transducer 36 may be used for similar communication purposes as the wired drill pipe telemetry transceiver 38A when signals are communicated using mud pressure or flow modulation telemetry, although typically at much lower data rates, as will be appreciated by those skilled in the art. Signals received from the instruments in the wellbore and detected by either of the transceivers 36A, 38A may be recorded, decoded and/or displayed by suitable equipment (not shown separately) in the recording unit 38 for subsequent interpretation.

One or more of the wellbore instruments 10, 14 may include the telemetry unit 16, a telemetry transceiver 16A and a data mass storage device or buffer 16B. The wellbore instruments 10, 14 may include, for example, devices for measuring parameters related to the electrical conductivity of the formations adjacent to the wellbore. Such devices may include one or more electromagnetic transmitters 10B coupled to a transmitter driver 10D, and one or more electromagnetic receivers 10A coupled to a receiver circuit 10C. Electrical conductivity may be determined by measuring variation of properties of electromagnetic waves as detected by the receivers 10A with respect to the electromagnetic waves as they are emitted by the transmitters 10B. Such properties, as will be appreciated by those skilled in the art, can include phase shift and amplitude reduction, for example. Signals detected by the receivers 10A may be communicated along an instrument bus 15 after processing through a controller 10E. The signals may be stored in the buffer 16B in the telemetry unit 16 after being processed by a telemetry controller 16C. Another example of measurements that may be made in the wellbore include, for example in the first wellbore instrument 14, acoustic parameters related to properties such as acoustic velocity of the formations surrounding the wellbore. An acoustic transmitter 14A may be operated by a transmitter driver 14E. One or more acoustic receivers 14B may be coupled to a receiver circuit 14D. Travel time, and changes in properties of acoustic waves generated by the transmitter 14A may be determined by measuring properties of the acoustic waves detected by each of the receivers 14B. As is the case with the second wellbore instrument 10, the first wellbore instrument 14 may include its own local controller 14C to control operation of the transmitter driver 14C and the receiver circuits 14D. The controller 14C may also communicate signals to and from the bus 15. Signals representative of the receiver 14B output may be communicated along the bus 15 to the buffer 16B in the telemetry unit 16 for eventual communication to the surface, e.g., using the wired drill pipe communication channel.

The foregoing examples of instruments in the wellbore are only provided to illustrate principles of the various aspects of the invention and are in no way intended to limit the types of instruments, the numbers of instruments or the locations of devices such as telemetry transceivers or buffers that may be used with various examples of the invention.

Only for convenience in the present description, signals generated by the recording unit 38 for communication to the one or more instruments in the wellbore may be referred to as "command signals." Such reference is made because in general, the recording unit 38 sends signals to the instruments in the wellbore for purposes of controlling their operation. However, it is to be understood that data or other types of signals may be communicated from the recording unit 38 to the instruments in the wellbore, including, as non-limiting example, instrument calibration data, time data, and operational data. Accordingly, the use of the term "command signal" is not in any way intended to limit the type of signals that may be transmitted from the recording unit 38 to the instruments in the wellbore consistent with the scope of the present invention. Correspondingly, signals transmitted from the instruments in the wellbore to the recording unit 38 may be referred to only for convenience as "measurement signals", because instrument measurements may be primarily what is communicated from the wellbore to the recording unit 38. However, as is the case with "command signals" the use of the term "measurement signals" is only shorthand and is not intended to limit the types of signals sent from the wellbore 10, 14, 16 instruments to the recording unit 38 consistently with the scope of the present invention.

In some examples, the instruments in the wellbore may include a mud flow modulator, shown in the exploded view portion of FIG. 2 at 16D, of any type known in the art for signal telemetry. The modulator 16D is configured to change an aspect of the flow of drilling mud through the drill string (20 in FIG. 1). Such aspects can include creating standing pressure waves and phase shift keying modulation, momentary increases in pressure and momentary decreases in pressure to represent digital bits, as non limiting examples. The mud flow modulation corresponds to selected measurements made, for example, by sensors in the wellbore instruments, e.g., 10 and 14 in FIG. 2 that are desired to be communicated to the recording unit 38 while drilling and/or mud circulating operations are underway. The drilling mud telemetry signal communication channel may be used in addition to the wired drill pipe telemetry signal communication channel, and in some examples may provide a back up communication channel in the event the wired drill pipe telemetry and/or signal communication channel fails. The modulator 16D may be operated by transmission of suitable driver signals from the controller 16C in the telemetry unit 16.

When the instruments in the wellbore, e.g., the wellbore instruments 10, 14, make measurements corresponding to, for example, trajectory of the wellbore and properties of the formations surrounding the wellbore, such measurements are typically indexed with respect to the time at which the particular measurements are made. Contemporaneously, a record indexed with respect to time is made in the recording unit 38 of the axial position (depth) of the instruments in the wellbore. Such record of axial position may be time correlated to the time indexed record of measurements made by the wellbore instruments 14, 10 to produce a record with respect to axial instrument position (and thus depth) of the various measurements made by the wellbore instruments 10, 14.

In the system shown in FIG. 2, one or more of the repeaters 22A, only one of which is shown in FIG. 2 for clarity of the illustration, may include a local controller 27, a local data mass storage device or buffer 25 and a telemetry transceiver. Some examples of repeater, such as the one shown in FIG. 2, may include a local sensor 29, non-limiting examples of which include a pressure sensor or a temperature sensor. Signals generated by the local sensor 29 may be processed by the repeater controller 27 for storage in the repeater buffer 25 and eventual communication to the recording unit 38 and/or to the instruments in the wellbore. The repeater 22A includes a telemetry transceiver 23 that can detect signals originating from either the wellbore instruments (from transceiver 16A) or from the recording unit (from transceiver 38A) and retransmit such signals in the direction of their intended destination. The destination can be any of the instruments in the wellbore, the recording unit 38, or another one of the repeaters 22A, depending on the position of the particular repeater in the drill string and the nature of the signals being communicated.

In the present invention, the transceiver 16A in the wellbore instruments, and the controller 27 in one or more of the repeaters 22A may be programmer to reconfigure the telemetry format used to communicate measurement signals and command signals in response to factors such as the actual capacity of the telemetry channel (e.g., the wired drill pipe channel and the mud modulation telemetry channel) and the importance of continuity and timing ("priority") of the particular signals to be transmitted in either direction. Such programming may include allocating selected portions of each buffer 25, 16B for particular types of signals based on the assigned signal priority. The telemetry format may be selected to interrogate signals from such allocated buffer portions for communication using reconfigurable priority selection techniques. The following description provides examples of such telemetry format and/or signal priority reconfiguration.

In one example, signals generated by the instruments in the wellbore (e.g., sensor measurements or "data") can be characterized by whether the data must be received at the intended destination, such as the recording unit, and whether the data must be received within a predetermined time limitation after their acquisition or generation. Examples of such data types include the following. Control signals or data ("CTRL") can include high priority information such as instrument status indication, instrument commands and responses to instrument commands. CTRL signals typically must be delivered to their destination within certain time constraints after their generation, and are of a priority such that they must reach the destination. A second type of data, called isochronous signals or data ("ISOC") can include signals such as instrument sensor data (e.g., as acquired by the wellbore instruments 14 and 10 in FIG. 2). Such data generally should have only the most recently acquired values transmitted to the recording unit (38 in FIG. 1) because the time between acquisition and recording is typically important, however, communication of all acquired ISOC date to the destination is typically not critical to operation of the instruments in the wellbore or to the data record made at the surface by the recording unit. This is particularly the case for LWD measurements that are recorded while the drill string is advancing slowly, such that the "data density", that is, the number of individual measurements per unit length of wellbore, is relatively high. A particular example of ISOC data includes sensor readings made by a wellbore imaging sensor. See, e.g., U.S. Pat. No. 5,339,036 issued to Clark et al. and assigned to the assignee of the present invention for a description of a non-limiting example of such an instrument. Another type of data is called bulk data ("BULK") and can include, for example entire wave trains of acoustic signals generated by the receivers in the LWD instrument (e.g., 14B in FIG. 2). Reception of such BULK data at the destination in their entirely is important, but there is substantially no time constraint on delivery to the destination, e.g., the surface recording unit, of such data.

The foregoing three example data types may be allocated into separate physically embodied buffers, or as explained above, in separately allocated portions of a single buffer or data mass storage device. Allocation of the data may be performed, for example, by "tagging" each type of data with one or more indicator bits appended to the digital word representing each measurement. For example, a two bit tag may be used to identify each of the three foregoing example data types. In other examples, more or fewer digital bits may be used to identify the data type for buffer allocation, and more or fewer types of data allocation in the buffers may be used.

In the present example, CTRL and BULK data may be allocated into "queuing" buffers. ISOC data may be allocated into a sensing buffer. A queuing buffer is a first-in first-out buffer and can be used for data that do or do not have limits on the amount of time between generation of the data and its detection at the destination. Other types of data, for example, corresponding to measurements made by various sensors (e.g., ISOC data) are substantially no longer useful when a newer sensor measurement is generated. Such data are placed in pre-set locations in a sensing buffer and are identified by their origin and type in the sensing buffer. Each storage location in the sensing buffer, therefore, is simply a placeholder for the latest available data. Each storage location in the sensing buffer is overwritten when newer data from the same sensor are transmitted to the sensing buffer. The communication system may apply time stamps to each data set in each buffer order to keep track of the time latency of the data sets.

The telemetry system may also apply a time stamp to the data when they are written to the buffer (e.g., 16B and 25 in FIG. 2).

By temporarily storing the data sets in the various buffers, it is possible to connect two communication systems that are not rate-synchronized with each other, and it is also possible to adapt the rates of the systems independently of each other.

Transport capacity of the telemetry system (e.g., wired drill pipe or mud modulation telemetry shown in FIG. 1) is limited, as compared with, for example armored electrical cable. Because the system telemetry typically operates as a half-duplex channel, there should be a schedule to control communication to the recording unit from the wellbore instruments, or to the instruments in the wellbore from the recording unit. "Uplink transport availability" is intended to mean that the telemetry channel is available to accept data to be transmitted from the wellbore instruments to the recording unit. Uplink transport availability may be indicated by a suitable command or similar signal transmitted from the recording unit. Whenever uplink transport is available, the transceiver in the telemetry unit (16A in FIG. 2) interrogates the CTRL data portion of the buffer (16B in FIG. 2) and all data "packets" in the CTRL data portion of the buffer are included in the telemetry for transmission to the recording unit. Then any unused communication channel transport capacity can be allocated first to transmitting ISOC data, and finally to transmitting BULK data. To perform the foregoing, the controller (16C in FIG. 2) will successively interrogate the CTRL portion of the buffer (16B in FIG. 2), the ISOC portion of the buffer (16B in FIG. 2), and then interrogate the BULK portion of the buffer (16B in FIG. 2). Data obtained during the buffer interrogation will be communicated to the transceiver (16A in FIG. 2) for transmission to and retransmission by each of the repeaters (22A in FIG. 2). The signals are ultimately communication to the recording unit. Each repeater, and ultimately the recording unit (38 in FIG. 2), may transmit an acknowledgment signal upon receipt of data from the wellbore instruments and/or prior repeater.

In the event some data are not communicated successfully to any of the repeaters or the recording unit (38 in FIG. 2), when re-transmission is requested as indicated by a command signal from the repeater or the recording unit (38 in FIG. 2), the controller (16C in FIG. 2.) can be programmed to cause the telemetry transceiver (16A in FIG. 2) to re-send all unacknowledged CTRL data in every instance, and any BULK data if uplink transport capacity is available. The controller can be programmed to cause transmission of the most recently written content of the ISOC buffer portion as requested, even if the latest data written in the ISOC buffer are different than the previously transmitted, unacknowledged ISOC data.

Figure 3:
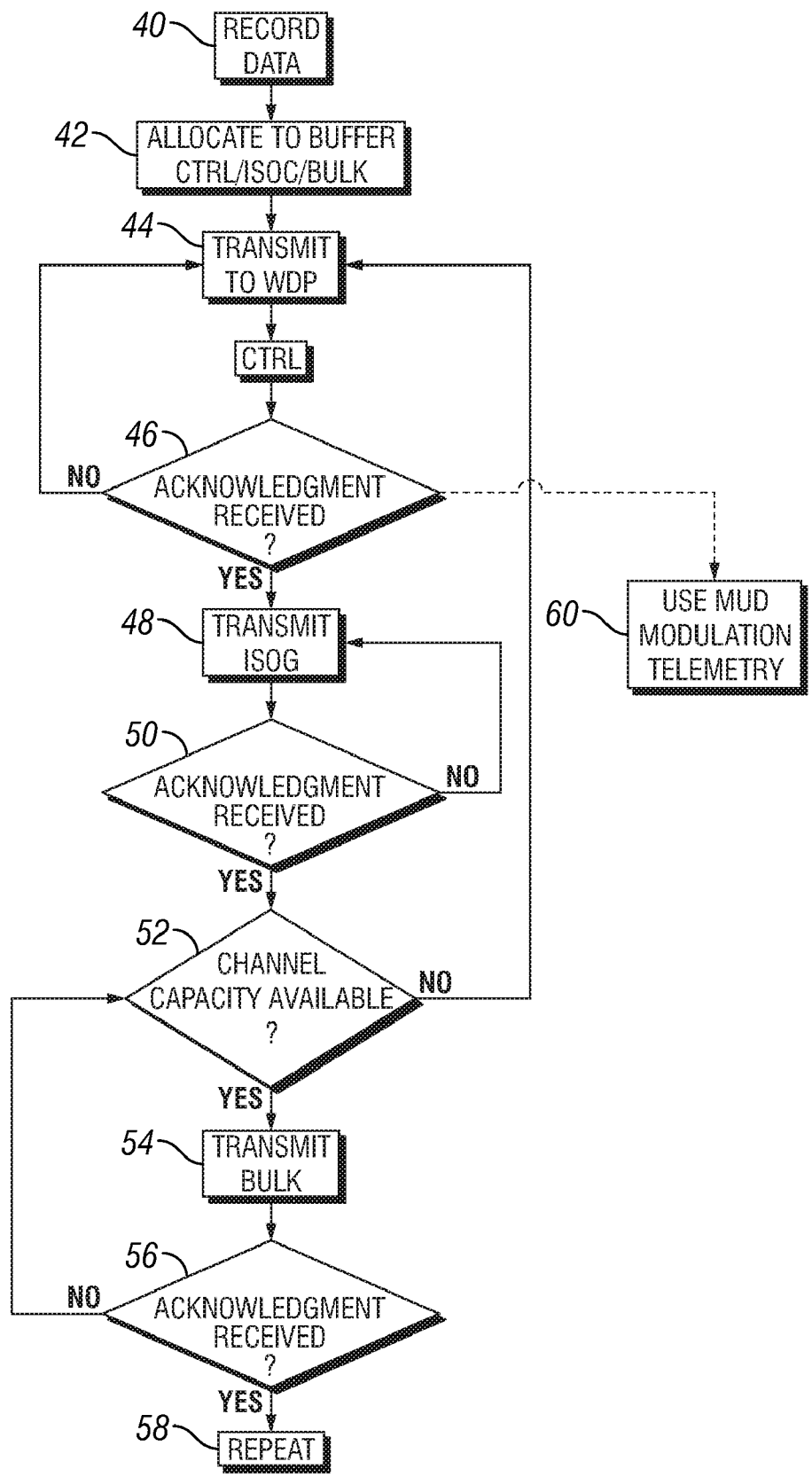
FIG. 3 shows an example telemetry procedure.

An example procedure using data allocated to selected types of buffers is shown in a flow chart in FIG. 3. At 40, data are acquired by the instruments in the wellbore, and if so provided, by the local sensor(s) (29 in FIG. 2) in the repeater(s) (22A in FIG. 2). At 42, the respective telemetry controllers allocate the data to a particular buffer, or to a particular segment of a buffer or mass storage device. In the present example, the above described CTRL, ISOC and BULK allocations may be performed. At 44, the CTRL data are interrogated from the buffer and are transmitted from the instruments in the wellbore to the surface using the wired drill pipe telemetry channel (which may or may not include repeaters). At 46, the telemetry controller (16C in FIG. 2) determines whether a data receipt acknowledgement signal has been detected from the recording unit. If no acknowledgment has been detected, the telemetry controller can cause the telemetry transceiver to retransmit the CTRL data. If the acknowledgment is received, at 48 the telemetry controller can then interrogate the ISOC buffer and attempt to transmit the buffer content to the surface. At 50, the telemetry controller determines whether an acknowledgment signal from the recording unit has been detected. If none, the telemetry controller will interrogate the ISOC buffer once again. If an acknowledgment signal has been detected, then at 52 the telemetry controller will determine whether sufficient communication channel capacity is present to transmit the BULK data buffer content, at 54. If insufficient capacity exists, the telemetry controller can return to transmission of CTRL buffer content at 44. If sufficient channel capacity exists, at 54, the BULK buffer content can be transmitted. At 56 the telemetry controller can determine whether an acknowledgment signal has been detected. If the acknowledgment signal has been detected, at 58 the telemetry procedure can be repeated. If no acknowledgment signal has been detected, the telemetry controller can determine again at 52 whether sufficient channel capacity exists to transmit the BULK buffer content.

In some examples, determining the communication channel capacity may include preprogramming the telemetry controller (16C in FIG. 2). Such preprogramming may be referred to as explicit determination of communication channel capacity. If the telemetry controller is not preprogrammed, it is possible in other examples to program the controller to cause the telemetry transceiver to transmit a test packet (a selected number of digital bits or words) and then detect an acknowledgment signal from the transceiver at the destination (e.g., one of the repeaters or the recording unit). If the determined communication channel capacity is less than expected, the controller, e.g., 16C in FIG. 2 and its counterpart in the repeaters, e.g., 27 in FIG. 2, may be programmed to use different priority for certain types of signals and upon receipt of such signals, store them in a different buffer. For example, some of the BULK data may be alternatively stored as ISOC data.

In the present example, a timeout feature can be included to determine wired drill pipe telemetry channel failure. For example, after a predetermined number of attempts to transmit the CTRL buffer content, if no acknowledgement signal is detected, the telemetry controller (16C in FIG. 2) can cause selected ones of the CTRL buffer signals to be applied to the mud modulation telemetry, at 60.

The foregoing explanation, for purposes of clarity, excludes the repeaters and other sensors/actuators distributed in the wellbore, however, each of the repeaters (22A in FIG. 2) used in any particular wired pipe string may be configured as shown in FIG. 2 and can be programmed to allocate signals to its respective buffer substantially in the same manner as is performed in the buffer in the telemetry unit (16 in FIG. 2). The repeater controllers (27 in FIG. 2) in each repeater can be programmed to interrogate the repeater buffer substantially as explained above with reference to the telemetry controller (16C in FIG. 2) to retransmit data and to detect acknowledgment signals from either the next repeater or the recording unit, depending on the position of the particular repeater. The repeater controller may also be programmed to determine both uplink and downlink telemetry channel capacity as explained above, and may be programmed to alter the data priority and telemetry format in response to telemetry channel capacity that is different from original program instructions.

In other examples, and returning to FIG. 2, the wellbore instrument telemetry transceiver 16A and the wired drill pipe transceiver 38A may be required to communicate on a wired drill pipe telemetry channel that does not form part of the same system as the wellbore instruments telemetry transceiver 16A and the wired drill pipe transceiver 38A. In such examples, an input to the wired drill pipe telemetry channel may include a device similar in overall configuration to the repeater 22A shown in FIG. 2, wherein data are communicated from the wellbore instrument telemetry transceiver 16A to the repeater transceiver 23, and data may be stored therein in the buffer 25. An output of such wired drill pipe telemetry may also include a device similar in configuration to the repeater 22A, wherein the transceiver 23 in the last such repeater is in signal communication with the wired drill pipe telemetry transceiver 38A. Typical configurations for such input and output devices include the devices enable transmission connection protocol (TCP) communication and that the buffer 27 is a first in-first out buffer, similar to a queuing buffer as explained above. Such configuration, in particular using first in-first out ("FIFO") buffers may make the wired drill pipe telemetry channel compatible with more than one type of wellbore instrument and recording unit system. In such examples, the telemetry controller 16C may be programmed to monitor the status of the FIFO transmit buffer 27, and in certain instances, either internally triggered or externally triggered such as using timers or bit tokens, selects from the telemetry buffers 16B which data sets to put in the FIFO buffer 27 first. In this example, in the event the TCP connection becomes bogged down, the telemetry system (through controller 16C) can prioritize the sending of time-sensitive data sets rather than having to send all data sets in a FIFO fashion, regardless of when the data sets arrive in the telemetry buffer 16B.

Methods and systems according to the invention may provide more efficient use of limited bandwidth in wellbore telemetry systems. While the foregoing example is explained in terms of wired drill pipe telemetry, it should be clearly understood that similar principles can be applied to mud flow modulation telemetry or extremely low frequency (ELF) electromagnetic telemetry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for communicating signals between an instrument in a wellbore and a device at the Earth's surface using a wellbore telemetry channel, comprising:
   allocating signals generated by at least one of an instrument in the wellbore and the device at the surface to a plurality of buffers, each buffer representing data having a respective communication priority;
   communicating signals from each buffer to the wellbore telemetry channel according to a predetermined priority procedure, the procedure allocating telemetry channel priority related to the communication priority; and
   determining whether the signals have been detected at the surface.

2. The method of claim 1 wherein the allocating signals comprises appending each signal with a multiple digital bit priority identifier.

3. The method of claim 1 further comprising determining whether the communicated signals have been detected in the-other of the surface device and the wellbore instrument, and recommunicating signals having a selected communication priority when signals having the selected communication priority have not been detected by the other of the surface device and the wellbore instrument.

4. The method of claim 3 further comprising communicating the signals having the selected communication priority to a mud flow modulation telemetry channel after a selected number of transmission attempts result in failure of signal detection by the recording unit.

5. The method of claim 1 wherein the buffers comprise at least one queuing buffer and at least one sensing buffer.

6. The method of claim 1 further comprising acquiring signals at a location intermediate the instrument in the wellbore and the surface device, and at such location repeating the allocating signals and communicating signals, the allocating and repeating including the intermediate acquired signals.

7. The method of claim 1 wherein the communication priority is related to whether the allocated signals must be detected by at least one of the wellbore instrument and the surface device within a predetermined time after generation of the signals by the other of the wellbore instrument and the surface device.

8. The method of claim 7 wherein the allocated signals comprise at least one of instrument status signals and command signals.

9. The method of claim 1 wherein the communication priority is related to whether all the allocated signals acquired by the instruments in the wellbore must be detected by the recording unit.

10. The method of claim 9 wherein the allocated signals comprise wellbore image signals.

11. The method of claim 1 wherein the wellbore telemetry channel comprises a wired drill pipe.

12. The method of claim 1 wherein the wellbore telemetry channel comprises mud flow modulation telemetry.

13. The method of claim 1 further comprising adjusting the communication priority in response to a determination of wellbore telemetry channel capacity.

14. The system of claim 13 wherein the wellbore data communication channel comprises a wired drill pipe string.

15. The system of claim 13 wherein the buffers comprise at least one queuing buffer and at least one sensing buffer.

16. The system of claim 13 wherein the telemetry controller is configured to allocate signals according to whether the signals from each source must be detected at the Earth's surface within a selected time of acquisition thereof, and whether all the acquired signals from each source must be detected at the Earth's surface.

17. A system for communicating signals from between a wellbore instrument and a device at the Earth's surface, comprising:
at least two sources of signals associated with the wellbore instrument;
at least one data buffer disposed in the wellbore instrument;
a telemetry transceiver in signal communication with the data buffer and a wellbore data communication channel; and
a telemetry controller disposed in the wellbore instrument, the controller configured to allocate signals from the at least two sources to corresponding portions of the data buffer, the controller configured to cause content of each portion of the buffer to communicate signals stored therein to the telemetry transceiver according to a predetermined priority, the controller determining whether the signals have been detected at the surface.

18. The system of claim 17 further comprising at least one data repeater disposed in the wired drill pipe string at a location intermediate the wellbore instrument and the recording unit, the repeater including a controller, a data transceiver and a data buffer, the repeater controller configured to allocate signals received from the wellbore instrument transceiver to a respective portion of the repeater buffer, the controller configured to conduct content of the respective portions of the repeater buffer according to a predetermined priority.

19. The system of claim 18 wherein the repeater controller is configured to adjust the predetermined priority in response to a determination of wellbore telemetry channel capacity.

* * * * *